United States Patent
Wright et al.

(10) Patent No.: US 10,029,715 B2
(45) Date of Patent: Jul. 24, 2018

(54) INTELLIGENT LOCOMOTIVE BRAKE CONTROL SYSTEM

(71) Applicant: NEW YORK AIR BRAKE, LLC, Watertown, NY (US)

(72) Inventors: Eric C. Wright, Evans Mills, NY (US); John M. Reynolds, Carthage, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 17 days.

(21) Appl. No.: 15/381,621

(22) Filed: Dec. 16, 2016

(65) Prior Publication Data

US 2018/0170413 A1 Jun. 21, 2018

(51) Int. Cl.
*B61L 15/00* (2006.01)

(52) U.S. Cl.
CPC ......... *B61L 15/0072* (2013.01); *B61L 15/009* (2013.01)

(58) Field of Classification Search
None
See application file for complete search history.

(56) References Cited

U.S. PATENT DOCUMENTS

| | | | |
|---|---|---|---|
| 5,249,125 A | 9/1993 | Root et al. | |
| 5,415,465 A | 5/1995 | Skantar et al. | |
| 6,024,419 A * | 2/2000 | Waldrop | B60T 13/665 303/15 |
| 6,249,722 B1 * | 6/2001 | Balukin | B60T 13/665 701/19 |
| 9,238,473 B2 | 1/2016 | Leonard et al. | |
| 9,283,945 B1 * | 3/2016 | Kernwein | B60T 17/228 |
| 2009/0125170 A1 * | 5/2009 | Noffsinger | B60L 7/16 701/20 |

OTHER PUBLICATIONS

International Search Report Form PCT/ISA/220, International Application No. PCT/US2016/067193, pp. 1-11, dated Nov. 17, 2017.

\* cited by examiner

*Primary Examiner* — Jonathan M Dager
*Assistant Examiner* — Garrett F Evans
(74) *Attorney, Agent, or Firm* — Bond Schoeneck and King PLLC; David Nocilly

(57) ABSTRACT

An intelligent locomotive brake control system which selects and optimizes use of dynamic, independent, and automatic brakes on the locomotive to assure intended brake power, to minimize in-train forces, minimize brake component wear, and to automate standard train brake protocol. The system may be programmed to alter an automatic brake application commanded by a train driver to omit or reduce the amount of the automatic brake application in favor of a dynamic brake application, and independent brake application, or combination thereof.

15 Claims, 9 Drawing Sheets

INTELLIGENT LOCOMOTIVE BRAKE CONTROL SYSTEM

BACKGROUND OF THE INVENTION

1. Field of the Invention

The present invention relates to locomotive braking systems and, more particularly, to a locomotive brake system that can selectively apply the independent and dynamic brakes in response to an automatic brake application to account for current train conditions and track geometry.

2. Description of the Related Art

A locomotive typically has three separate, individually controlled brake systems. First, a locomotive has the independent brake that is a locomotive-only pneumatic brake controlled by the independent brake handle in the cab of the locomotive. Next, a locomotive has an automatic brake that applies the brakes on the train and on the locomotive by the automatic brake handle. Finally, the dynamic brake that provides braking power from the locomotive traction motors and is controlled by the dynamic brake handle in the cab of the locomotive.

A train consisting of one or more locomotives and as many as 200 freight cars may be more than two miles in length. This length presents a number of issues as the train may be traveling over complex territory including curves and hills that require portions of the train to be braking while others are not. The driver is thus required to manually select the best brake settings, or combination of brake setting, with respect to the state of the train, the geometry of the track on which the train is currently and imminently operating to minimize in-train forces to prevent derailment of the cars or damage to lading.

This brake selection process is complicated by a number of factors. For example, an automatic brake application results in a sequential application of the brakes of the rail cars from the front of the train to the rear of the train and thus does not impact the entire train at the same time. The existence of slack between each rail car can further complicate the brake application. In addition, release and recharge of the train (automatic) brake can take many minutes depending on the amount of brake applied, so rapid on and off cycling of the automatic brakes is not possible without depleting the train brake air supply. If there is too much train brake set on a down grade and the train is slowing undesirably, rather than releasing the brakes, the train driver may increase the tractive power of the locomotive to pull the train down the grade against the train brakes. This practice is known as "power braking" and is a clear waste of fuel and the brakes.

The independent and dynamic brakes on the locomotive provide the train driver with a means to modulate the application and release of the brakes on the locomotive to provide some overall modulation of the brake power on the train. The independent and dynamic brakes may be applied and released completely independently from the automatic brake, thus it is possible and common to use only the independent and/or the dynamic brake to control the train speed where track geometry and speed limits allow for the practice. When either the independent or dynamic brake are used, that locomotive (or locomotive consist) is braking the mass of the entire train from the front of the train. As result, high in-train forces can result as the rear of the train compresses the slack between each car and runs into the front of the train. Railroads may also have train operating rules and procedures which prioritize the use of the dynamic brake so that there is less wear on the brake shoes and wheels on the locomotive, and some railroad use interlocking mechanisms to prevent the concurrent application of the independent and dynamic brakes.

Finally, during emergency braking, which is a maximum automatic brake application, the locomotive automatic emergency brake will also apply on the locomotive. To prevent high in-train forces resulting from train run-in during emergency braking, the train driver is usually trained to "bail" or release the locomotive brake so that the locomotive stretches the train during the emergency brake application. This stretching action is only of use during the initial seconds of the emergency brake application while the emergency automatic brake application propagates through the train and all of the train brakes apply. Once the train brakes are applied, it is desirable to apply the locomotive brakes to achieve the minimum possible stop distance.

It is clear that in any situation, including an emergency, the train driver cannot possibly know and take into consideration the instantaneous train dynamics, the rate of brake propagation, the track geometry, and other factors for determining the optimum settings, such as bail-off and re-application of the locomotive brakes during an emergency stop. Accordingly, there is a need for an intelligent brake control system that can balance the various factors involved in brake applications, whether automatic, independent, or dynamic, to assist a train driver in safely controlling a train.

BRIEF SUMMARY OF THE INVENTION

The present invention is an intelligent braking system than can command braking operations that differ from those specified by the train driver to achieve predetermined criteria while still achieving the overall braking result specified by the driver. The system includes an interface for receiving input from a train driver using an automatic brake handle and a dynamic brake handle and a controller coupled to the interface and having a first module for commanding a dynamic brake application, a second module for commanding an independent brake application, and a third module for commanding an automatic train brake application. The controller is programmed to command an independent brake application or a dynamic brake application, or a combination thereof, while attenuating an automatic brake application input by a train driver to accomplish at least one predetermined braking criteria. The independent brake application or the dynamic brake application, or the combination thereof, that is commanded by the controller should achieve a braking effect that is equal to what would have otherwise occurred if the system has allowed the full amount of the automatic brake application that was input by the train driver. The predetermined criteria may include minimizing the amount of wear of consumable brake system parts, the amount of in-train forces that will result from the braking, and the amount of subsequent power braking that may be needed, as well as combinations thereof. The controller is programmed to include standard train dynamics formula that can calculate the current and future operation of the train over a given route. The controller uses the train dynamics formula to select the independent brake application or the dynamic brake application, or the combination thereof, that will achieve the braking effect that is equal to the automatic brake application input by the train driver.

The controller may be programmed to automatically compensate for a dynamic brake failure by commanding an equivalent independent brake application or automatic brake application. The controller can also obtain feedback about the operation of the train after the independent brake application or the dynamic brake application, or the combination thereof, and to perform an adjustment of the train dynamics formula if the train does not behave as expected. The controller may further be programmed to maintain a particular train speed by automatically commanding a dynamic brake application, an independent brake application, or an automatic brake application, of combination thereof. The controller can also be programmed to compensate for the state of the train braking system when determining the independent brake application or the dynamic brake application, or the combination thereof, that will achieve the braking effect that is equal to the automatic brake application input by the train driver.

The present invention includes a method of controlling a train braking system by providing an interface for receiving input from a train driver using an automatic brake handle and a dynamic brake handle, a controller coupled to the interface and having a first module for commanding a dynamic brake application, a second module for commanding an independent brake application, and a third module for commanding an automatic train brake application. The controller is then used to command an independent brake application or a dynamic brake application, or a combination thereof, while attenuating an automatic brake application input by a train driver to achieve the predetermined criteria. The independent brake application or the dynamic brake application, or the combination thereof, that is commanded by the controller should achieve a braking effect that is equal to the automatic brake application input by the train driver. The method can include the step of automatically compensating for a dynamic brake failure by commanding an equivalent independent brake application or automatic brake application, or combination thereof. The method can also include the steps of obtaining feedback about the operation of the train after the independent brake application or the dynamic brake application, or the combination thereof, and performing an adjustment of the train dynamics formula if the train does not behave as expected.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
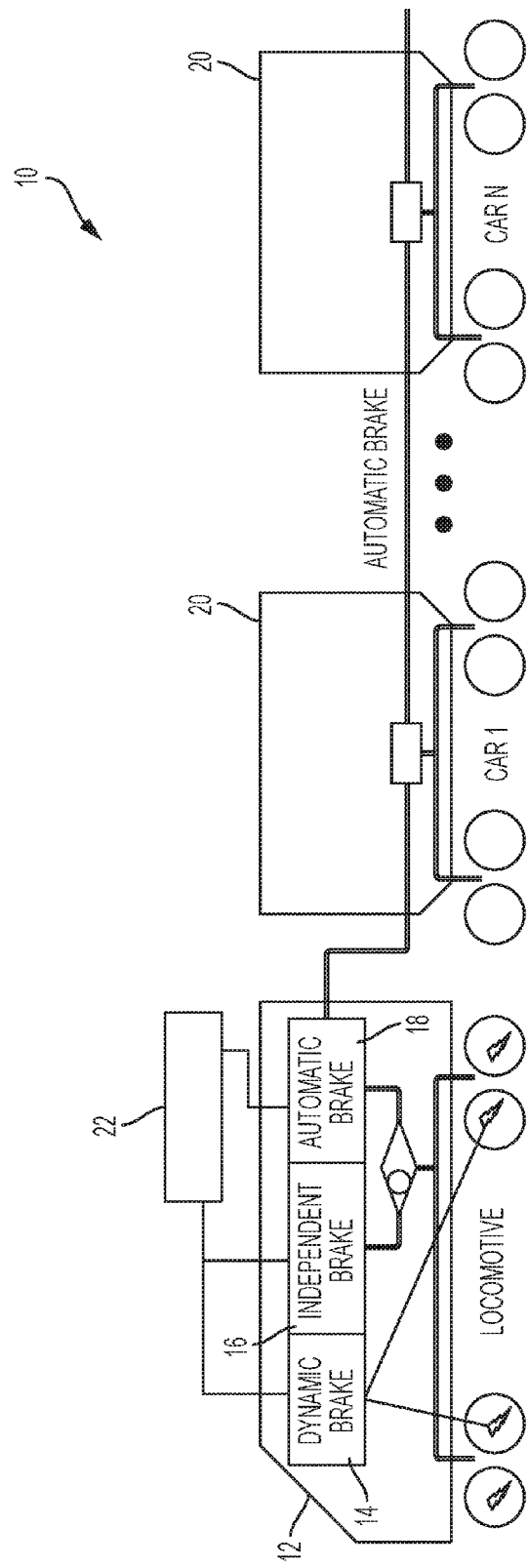
FIG. 1 is a schematic of an intelligent brake control system interfaced with the braking systems of a locomotive according to the present invention.

Referring to the figures, wherein like numerals refer to like parts throughout, there is seen in FIG. 1 an intelligent brake control system 10 for a locomotive 12 that interfaces with the existing dynamic brake 14 and independent brake 16 of the locomotive as well as the automatic brake 18 that applies the brakes of one or more rail cars 20 being pulled by the locomotive 12. System 10 may be configured as a standalone system, integrated into computer controller brake of a locomotive, or located in the energy management system (or a combination thereof).

Figure 2:
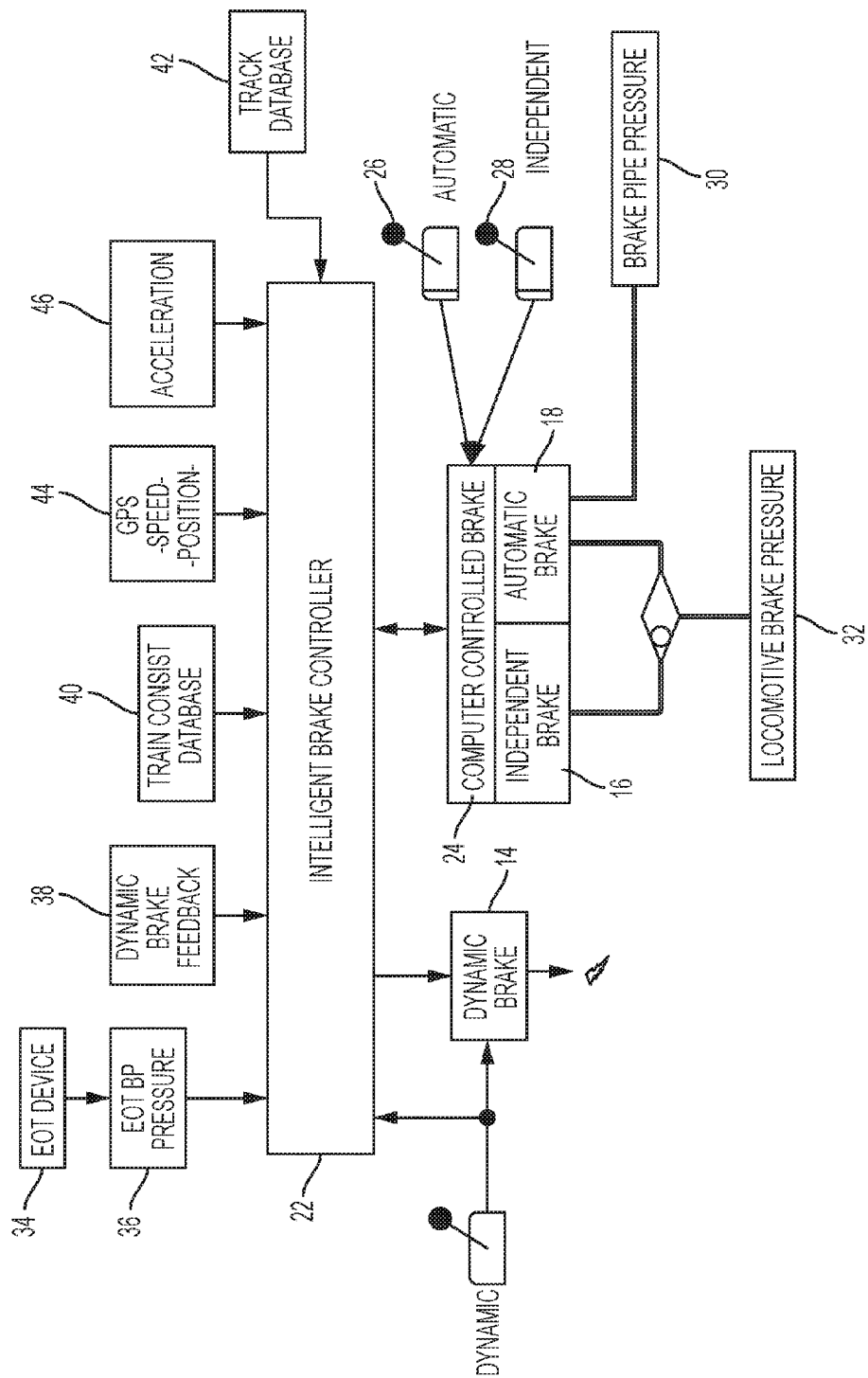
FIG. 2 is a schematic of an intelligent brake control system for a locomotive according to the present invention.

Referring to FIG. 2, system 10 comprises a main controller 22 that is in communication with or part of the computer controlled brake 24 of a locomotive. The computer controlled brake 24 is the locomotive equipment used to respond to train driver inputs by executing or commanding the brake settings as selected by the train driver, such as the CCB II® computer controlled brake available from New York Air Brake, LLC of Watertown, N.Y. As is known in the art, computer controlled brake 24 receives signals generated by the automatic brake handle 26 and the independent brake handle 28 positioned in the cab of a locomotive and is responsible for transforming the user handle inputs into brake system commands, such as changes in the brake pipe (BP) pressure 30 used to selectively apply and release the brakes of the attached rail cars 20 and changes in the locomotive brake pressure 32 used to selectively apply and release the locomotive brakes.

Controller 22 is also in communication with the end of train (EOT) device 34 to obtain the EOT brake pipe (BP) pressure 36, which provides information about the propagation of brake signals along the length of the train, and which can be determined by comparing the brake pipe pressure at the head end of the train to the brake pipe pressure at the rear. During a brake release and recharge, for example, controller 22 can determine the train brake pipe taper (BP Pressure$_{Loco}$–BP Pressure$_{EOT}$) and read the air flow into the brake pipe at locomotive 12 from the brake pipe air flow meter and determine the state of recharge of the brake system and the brake reservoirs on the train. Controller 22 is in communication with the dynamic brake 14 to selectively apply and release the dynamic brake 14, and to a dynamic brake feedback module 38 that provides information about the status of the dynamic brake current in the dynamic brake resistor grids. Dynamic brake power is dependent on the train speed, with standard dynamic brake curve being known in the art and usable for this purpose. Controller 22 may obtain the train speed from GPS 44 and obtain the dynamic brake feedback current, which is proportional to the dynamic brake retarding force at that speed, compare the speed and dynamic brake feedback current to the characteristic dynamic brake curve for that locomotive to determine the provided dynamic brake force on the train. Controller 22 is also in communication with a train consist database 40 that supplies information about the makeup of the particular train, such as the number and type of locomotives in the consist, the number of rail cars, the weight of the rail cars, etc. that is needed for properly determining train dynamics. Controller 22 is in communication with a track database 42 having information about the track to be traversed by the train, such as the grade and curvature of each section of the track along the route. Controller 22 is also in communication with a location device 44 that identifies where the train is located on the track as well as how fast and in what direction it is traveling, such as that provided by a global positioning system (GPS). Finally, controller 22 may be in communication with an accelerometer 46 that provides data about the change in velocity of the train.

Figure 3:
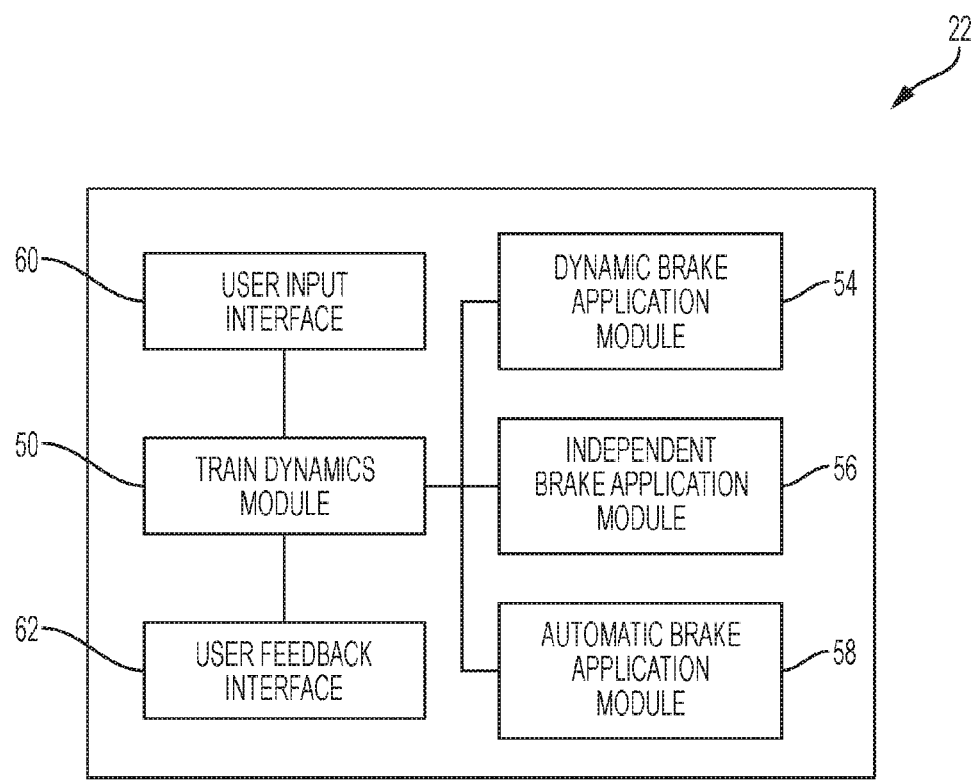
FIG. 3 is schematic of a controller for an intelligent brake control system for a locomotive according to the present invention.

Referring to FIG. 3, controller 22 includes a train dynamics module 50 that is programmed to execute conventional train dynamic formula using the various data and information provided by EOT device 34, dynamic brake 14, train consist database 40, track database 42, location device 44, and optionally accelerometer 46 to determine the in-train forces as train traverses the track. The underlying calculations are based on the laws of physics and are currently used by train control systems, such as the LEADER® system available from New York Air Brake, LLC of Watertown, N.Y. to determine the present behavior of a train and to predict how the train will behave in the near future based on its current dynamics and the grade and curvature of the upcoming track.

Controller 22 further includes a dynamic brake application module 54, an independent brake application module 56, and an automatic brake application module 58. These modules are programmed to selectively apply or release the corresponding brakes in response to signals received from automatic handle 26 and independent handle 28 via a user input interface 60. For example, dynamic brake application module 54 and independent brake application module 56 may be programmed to selectively apply or release the dynamic brake and/or the independent brake in response to a train driver making an automatic brake command using automatic brake handle 26 based on the current dynamics of the train as determined by train dynamics module 50. The application or release of the dynamic brake and/or the independent brake by dynamic brake application module 54 and independent brake application module 56 may be performed in addition to, or in replacement of an automatic brake application that would otherwise have been performed in response to the user input.

Controller 22 is programmed to determine whether to apply or release the dynamic brake and/or the independent brake based on one or more predetermined criteria, such as the minimization of in-train forces, the minimization the need for subsequent power braking, and the minimization of use of consumable brake system parts, while providing the response expected by the train driver based on the initial automatic brake command input via handle 26. Controller 22 may optionally be programmed to use acceleration information from accelerometer 46 (or compute acceleration from changes in velocity over time) to determine the effectiveness of various combinations of the three braking systems to determine which combination or combinations best achieves the desired result and to then dynamically optimize the train dynamics used by train dynamics module 50 for improved braking in the future.

Figure 4:
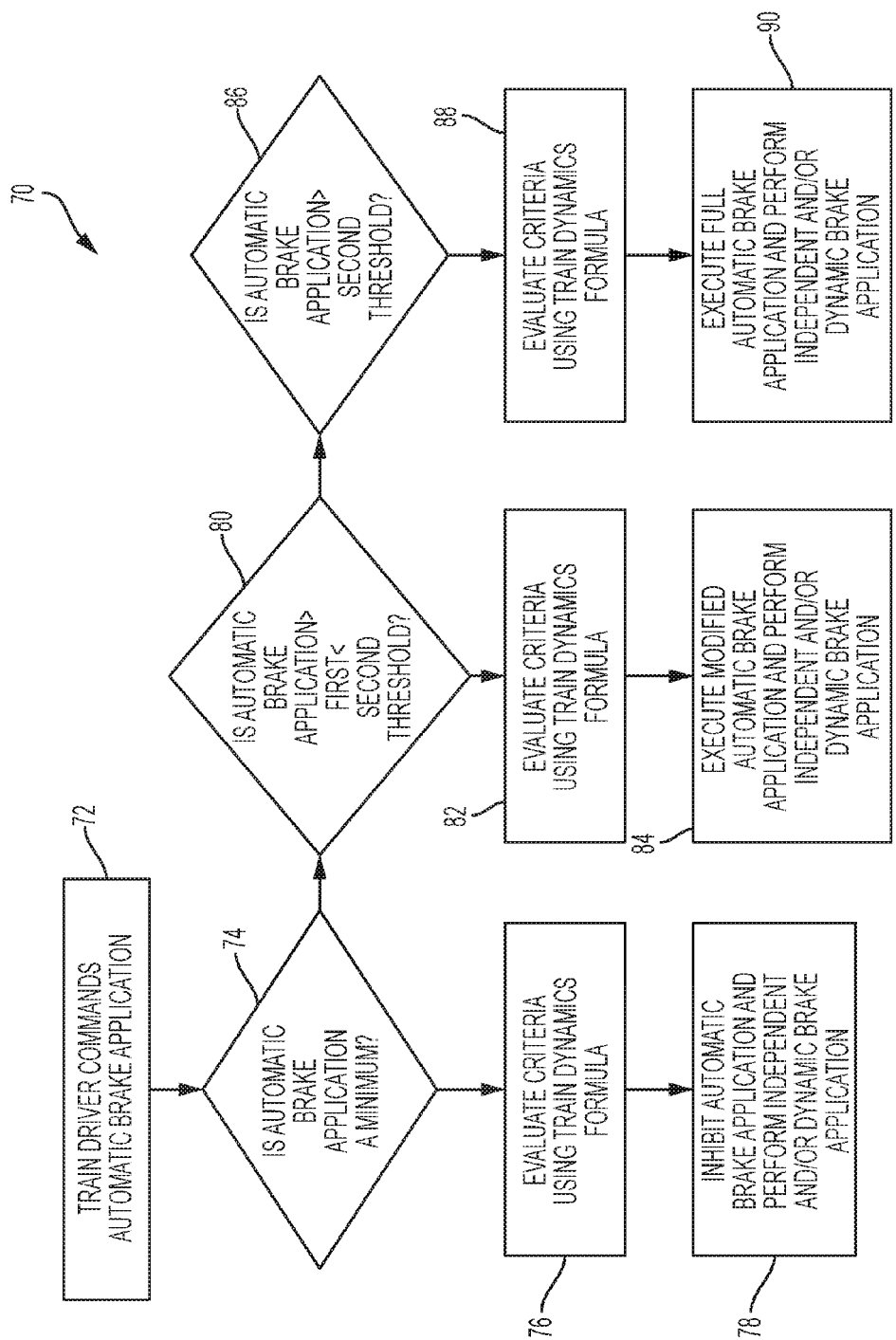
FIG. 4 is a flowchart of a control process for an intelligent brake control system according to the present invention.

Referring to FIG. 4, controller 22 may be configured to adjust its brake control strategy depending on the magnitude of the automatic brake command issued by the train driver. Controller 22 may read the automatic brake command, calculate the expected train brake performance and calculate an alternate brake strategy which provides the same train brake power but optimized based on one or more predetermined criteria, such as the minimization of in-train forces, the minimization the need for subsequent power braking, and the minimization of use of consumable brake system parts. More specifically, controller 22 may be programmed to attenuate any automatic brake application input by a train driver and command an independent brake application or a dynamic brake application, or a combination thereof, which compensates for the attenuated automatic brake application and achieves the predetermined braking criteria set by the user. For example, controller 22 can execute an automatic brake command override process 70 in response to a train driver commanding an automatic brake application 72. A check 74 is performed to determine whether the brake command is a minimum level automatic brake command. If so, controller 22 evaluates the predetermined braking criteria (minimizing in-train forces, minimizing the need for subsequent power braking, minimizing the use of consumable brake elements, etc.) using train dynamic formula 76 and then applies a sufficient amount of just the dynamic and/or independent brakes to meet the criteria 78 without applying the brakes of the rail cars. If check 74 determines that more than a minimum brake application was requested, a second check 80 is performed to determine whether the automatic bake application command 72 exceeds a first predetermined threshold brake pipe reduction, such as 7 psi, but does not exceed a second threshold, such as 15 psi. If so, controller 22 can evaluate the criteria using train dynamics 82 and then execute a reduced automatic train brake application that is augmented by an independent and/or dynamic brake application 84 to provide the requested brake power. If brake command 72 does not satisfy check 80, a third check 86 is performed to determine whether the automatic bake application command 72 exceeds the second predetermined threshold, such as 15 psi. If so, controller 22 evaluates the criteria using train dynamics 88 executes a full amount of requested automatic train brake 90. Controller 22 may thus adjust the amount of attenuation of the automatic brake application between full suppression of the automatic brake application in minimal application scenarios and no suppression of the automatic brake application in emergency scenarios.

For automatic train brake (service and/or emergency) applications, controller 22 may selectively sequence the application of the dynamic and/or independent brakes on the locomotive and the train brakes to minimize in-train forces. For example, it is desirable under certain combinations of current train conditions and the track geometry to bunch the train by first applying the locomotive brakes and then applying the train brake. Under other combinations of train conditions and track geometry, it is desirable to stretch the train by first applying the automatic train brake while bailing off the locomotive brake for a period. Controller 22 may then be programmed to modulate or reapply the locomotive brakes once the desired bunching or stretching has been achieved. In trains with Segmented Brake Pipe, controller 22 can be programmed to brake individual sections of the train. In electronically controlled (EP) trains, controller 22 can even be programmed to brake individual cars or sections of the train.

In an automatic brake application, controller 22 may selectively apply either the locomotive dynamic or independent brake on the locomotive in lieu of the automatic brake at an application rate and application level calculated to minimize in-train forces. The amount of brake applied on the locomotive can vary with time depending on the state of the train brake application propagation, the train speed, and the track geometry. Controller 22 may also preferentially apply the dynamic brake on the locomotive in lieu of or in supplement to a partial automatic brake to minimize brake shoe wear on the locomotive during an automatic brake application. It should be recognized that the particular brake application selected by controller 22 can be configurable for any particular installation, thereby allowing a customer to optimize according to needs. For example, controller 22 may be programmed to give more weight to minimizing wear on a freight train and more weight to minimizing in-train forces on a passenger train. Controller 22 may also be programmed to perform brake application that are allowed, or even required by the rules of a particular jurisdiction, such as those promulgated by the Association of American Railroads (AAR).

Controller 22 may thus be used to provide "single-handle" brake control where the train driver need only make a brake application via automatic brake handle 26, with controller 22 automatically providing the optimum dynamic and/or independent brake application, if any, with no further input by the train driver.

Controller 22 may include a user feedback module 62 that can be placed into communication with any driver display and programmed to cause the display to show positions of handles 26 and 28, including mapping to deceleration rate or percent brake rather than psi increments of equalizing reservoir (ER) reduction. Feedback to the train driver could also be given on an EBV display. In a typical AAR locomotive, for example, the automatic brake handle position is proportional to the amount of ER (pressure which pilots brake pipe pressure in the train. The train driver thus expects certain ER and BP pressures for corresponding handle positions. Because controller 22 is using all three available brake systems on the train to optimally satisfy the brake request of the train driver, the actual ER and BP pressures might be different than expected. The change in the display feedback to the train driver would address this issue by displaying a percent brake rather than or in addition to the actual ER/BP reduction that results.

Controller 22 may also automatically compensate for a dynamic brake failure by providing an equivalent independent brake application or automatic brake application. For example, if a dynamic brake failure occurs during a dynamic brake call, controller 22 will receive notice of this via dynamic brake feedback module 38 and can automatically provide the equivalent independent brake, either on the entire locomotive consist or only on the locomotive with the failed dynamic brake. Controller 22 may thus automatically compensate for the loss of dynamic brake effort by performing an equivalent level of friction braking using the independent brakes of the entire locomotive or even just an individual bogie. Further, if the dynamic brake has previously failed, and the train driver unknowingly makes a dynamic brake application, controller 22 can automatically provide the equivalent independent brake. These compensating approaches of controller 22 significantly improve train safety. With the use of accelerometer 46, controller 22 can also monitor the effectiveness of each brake application type in a given train during operation, and adjust future braking application levels based on the monitoring. For example, if a connected locomotive has an otherwise undetected dynamic brake failure, the dynamic brake response will be less than anticipated by controller 22. In that case, controller 22 can apply additional independent braking to offset the reduced efficiency of the dynamic brake.

Controller 22 may be programmed to provide dynamic brake blending. The available dynamic brake power available is dependent on train speed. In particular, the available dynamic brake force is reduced as the train speed approaches zero. Controller 22 may augment the loss of dynamic brake power due to the train slowing by automatically applying an offsetting amount of independent brake.

Controller 22 may be programmed to maintain train speed and/or reduce and maintain speed to meet any speed limits by automatic application of the optimum combination of dynamic, independent and automatic brakes. In this mode, controller 22 calculates the minimum needed automatic brake application for the current conditions and approaching grade and then determines the appropriate braking action to maximize the dynamic brake/independent brake contribution to provide the maximum brake modulation capability for the train in that grade situation. For example, when approaching a long down grade, the train driver may select an option for automatic brake modulation to optimally maintain a target speed. When approaching the grade, controller 22 may determine the current train speed and compares it to an optimal speed to begin traversing the grade. Controller 22 may slow the train to reduce the speed to the optimal entry speed as needed. Controller 22 may then calculate the minimum required automatic brake for the entire grade, or for that portion of the grade, until it will be safe to release and recharge the automatic brake. Controller 22 may apply the automatic brake to the calculated amount. Depending on the track profile, the control may make the brake application in one or more split reductions, i.e., a small automatic brake application followed incrementally by one or more increasing large brake application (the automatic brake on a train can be applied in steps, but may only be released in a single step, called direct release). Controller 22 may then maintain target speed by modulating the dynamic and/or independent brakes. If the train is equipped with a segmented brake pipe, then the controller may apply and release the automatic brakes in each brake pipe segment asynchronously in addition to modulating the dynamic and independent brakes. The automatic brake control mode of controller 22 may be terminated in response to any subsequent manual brake application, or by the end of the down grade and corresponding elimination of the need for a brake application to maintain the speed of the train.

Controller 22 may also be programmed with rules governing the minimum incremental automatic train brake "split reductions" based on the length of the train in train consist database 40, the EOT brake pipe pressure 36 from the EOT device 34 on the last car, brake pipe taper (BP pressure at the locomotive minus the BP pressure at the EOT), BP flow and related factors. Similarly, controller 22 may be programmed to dynamically establish a minimum automatic brake application based on the state of recharge of the brakes based on the length of the train, the EOT brake pipe pressure 36, brake pipe taper (BP pressure at the locomotive minus the BP pressure at the EOT), BP flow and related factors. If the train brakes have just been released, and the brakes must be immediately reapplied, then the reapplication must be greater than the brake application which was just released to assure that the brake application propagates through the train. If the release and recharge is partially complete, then the re-application of the brake must be greater than the brake pipe taper measured at that time, or preferably, if the steady state taper is known, based on prior measurement while the brakes are completely released and recharged, then the reapplication must be at least, as an example:

$$[\text{Brake Pipe Taper}]_{current} - [\text{Brake Pipe Taper}]_{steady\ state}$$

or at least 6 psi brake pipe reduction, whichever is greater. Controller 22 can also increase the train braking level if controller 22 determines that the train braking capacity is less than 100 percent charged. This compensating approach is particularly important for trains that are braked by reducing the train brake pipe pressure to cause air to flow from the compressed air storage reservoirs into the brake cylinders of the individual rail cars. Controller 22 may monitor brake pipe pressure as well as the flow rate of compressed air from main reservoir into the brake pipe to calculate the level of charge of the compressed air storage reservoirs of the rail cars. When available, controller 22 may also use additional parameters to further refine the accuracy of this calculation, such as train length. When controller 22 calculates that reservoirs of the tail cars are not fully charged, controller 22 can command a larger reduction of brake pipe than the unmodified nominal value to ensure that an effective automatic brake is applied.

Figure 5:
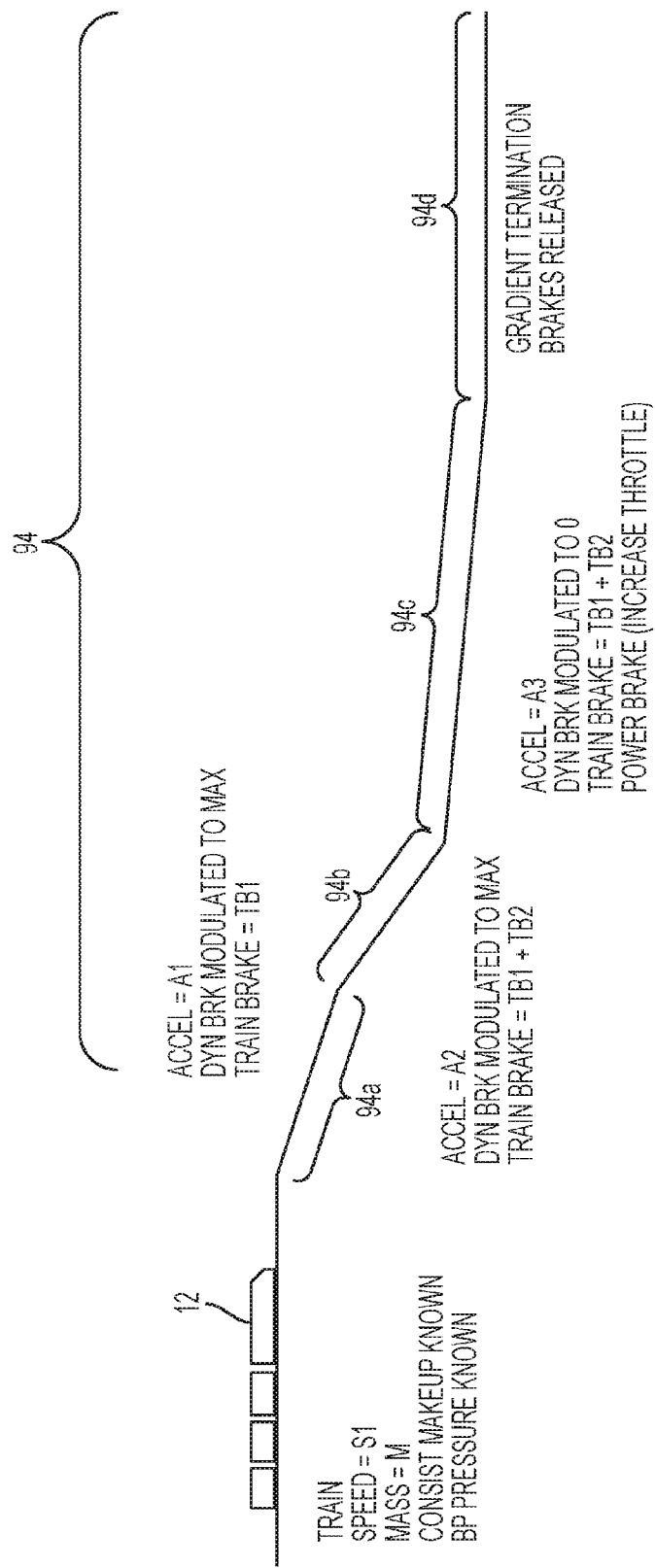
FIG. 5 is a schematic of a segmented downgrade approach implemented by an intelligent brake control system according to the present invention.

Referring to FIG. 5, as a train equipped with an intelligent locomotive brake control system according to the present invention approaches a down-grade 94, controller 22 may calculate the theoretical acceleration of the train due to the gradient at incremental look-ahead segments 94a through 94c on the down grade, assuming there are no brakes applied. For example, Controller 22 can perform this calculation using the track profile from track database 42, the train make up characteristics from train consist database 40, and known train dynamics models on train dynamics module 50. Each down grade profile segment 94a through 94c may then be assigned an acceleration value. The total train brake force needed to balance each profile segment may be calculated as F=MA, where M is the mass of the train, which is approximately known from train consist database 40, and where A is the acceleration due to gravity, as previously calculated.

The relationships between the brake force generated and each of dynamic, independent, and automatic brake are known and are dependent on the train make up, brake pipe pressure, the number of locomotives, etc., all of which are available to controller 22. To determine the optimum braking strategy, controller 22 first determines the total dynamic brake power/force available in the train and subtracts this from F, the total required train brake force, for each segment. If the available dynamic brake power/force exceeds or is equal to the total required train brake force, then the required dynamic brake will be set equal to the required train brake power. If the available dynamic brake is less than the required train brake power, controller 22 can determine if any of the locomotives 12 in the consist do not have available operative dynamic brakes. If so, an equivalent independent brake on that locomotive will be determined and this additional available brake force will be subtracted from the total required train brake force. The remaining unfulfilled total required train brake force may be provided by the automatic train brake. Controller 22 may then calculate the required brake pipe reduction which will result in the required needed train brake force. If the calculated brake pipe reduction is less than a "minimum" reduction, then controller 22 can calculate the train brake force resulting from a minimum automatic brake application, subtracts that amount from the total required train brake force, and assign the remaining required brake force to the dynamic brake and/or independent brake as previously described.

Controller 22 may determine the brake strategy for each gradient segment 94a through 94c, including at least one terminating segment 94d where controller 22 calculates that the automatic brake may be fully released and recharged before a next automatic brake application may be needed. Controller 22 then compares the brake strategy for each of the co-joined gradient segments 94a through 94c and determines which segment requires the highest level of automatic brake. Because the automatic brake can be incremented on, but not off, once the automatic brake has been applied to a high level, the brake strategy for all subsequent gradient segments will recalculated as the total required train brake force for that segment minus automatic train brake force. If the difference is positive, then controller 22 can balance the grade with dynamic brake or, alternatively, with independent brake. If the difference is negative, then controller 22 can advise the train driver to increase the locomotive throttle and perform a power brake.

While a first control strategy may seek to maintain a constant speed by modulating the available brakes throughout the grade profile, an alternative control strategy may seek to minimize power braking by controlling the train speed within a broader range of limits. For example, to minimize the maximum automatic train brake force needed in conjunction with the methods to fully utilize dynamic and independent brake described above, controller 22 could set the initial brake to reduce the speed of the train at the entry point of the steep track segment and choose an automatic brake level which allows the train to accelerate while braking but at a rate such that the train does not exceed the speed limit by the time it has terminated the steep section of track. In operation, as the train actually traverses each gradient segment 94a through 94c, controller 22 will firstly control the brakes to the predefined brake strategy, and then improve the plan based on actual train speed, acceleration, or deceleration. Priority will be given by controller 22 to controlling the train speed and acceleration/deceleration by first modulating the dynamic brake, secondly the independent brake, and lastly the automatic brake. Clearly, while the calculations have been described in terms of brake force, train mass, and acceleration, they could also be done in terms of train energy (kinetic and potential) and brake power, or other consistent units of measure.

Controller 22 may also be programmed to automatically compensate for a failure of independent brake by automatic application of any or all of the dynamic brake, automatic brake, or in some cases, the powered hand brake on locomotive 12. A single locomotive 12, or a consist of locomotives 12 without any attached rail cars, is referred to as a "light" locomotive or consist. The independent brake is generated on lead locomotive 12 and transmitted to any trailing locomotives 12 via the trainline 20 pipe. If the 20 pipe angle cock at the terminating end of the light locomotive 12 (or light consist) is open, then the 20 pipe pressure will be vented to atmosphere and the independent brakes will not apply. This may present a serious safety concern, especially when locomotive 12 in in close quarters in a rail yard. Controller 12 may thus include an input reflecting 20 pipe pressure in addition to the independent brake command 28 provided by the train driver. When an independent brake command 28 fails to produce the required 20 pipe pressure, controller 12 may be programmed to automatically provide an automatic brake application, to apply a dynamic brake if locomotive speed is sufficient and the brake pipe is charged on the light locomotive, or to apply the powered hand brake on light locomotive 12.

Figure 6:
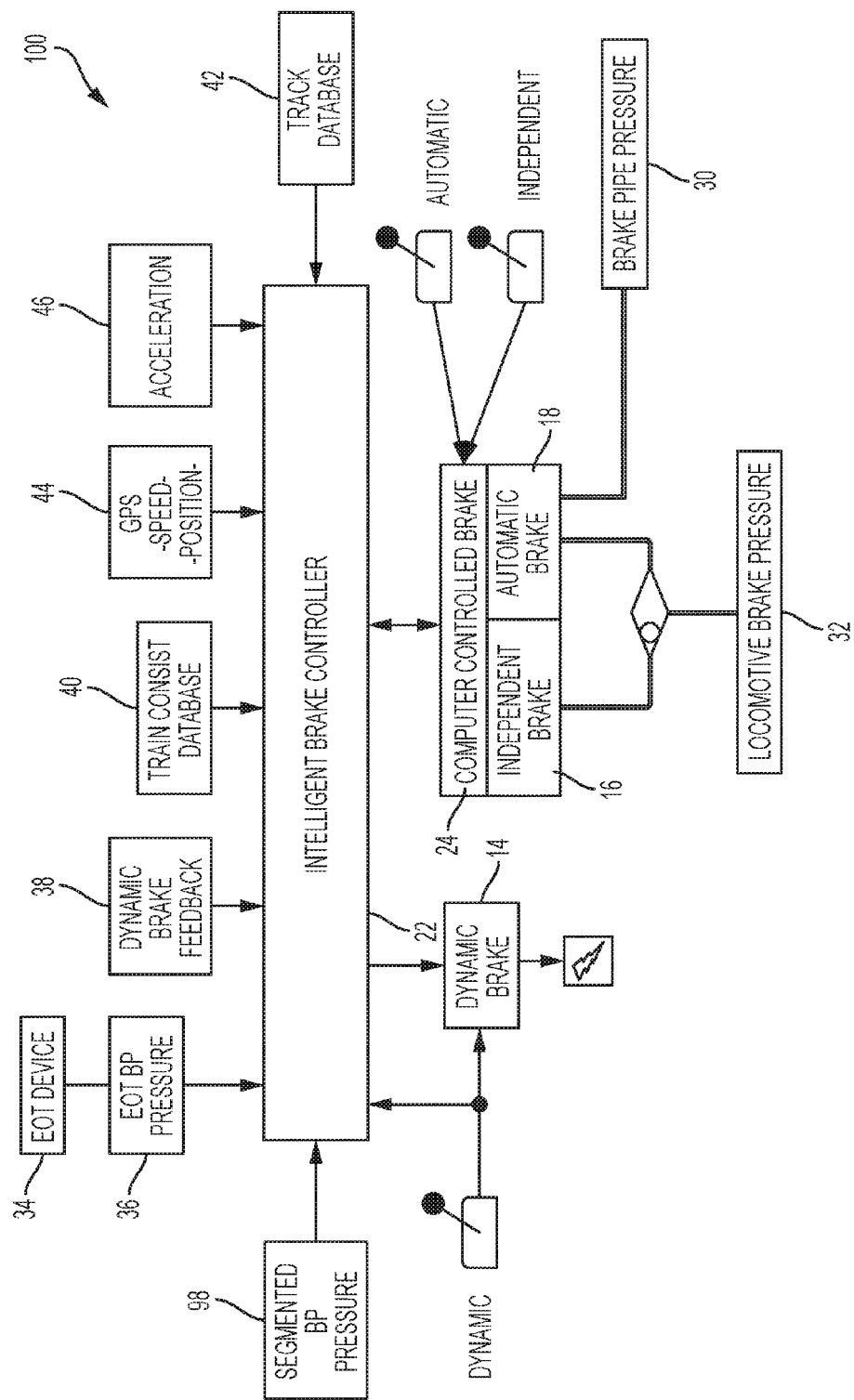
FIG. 6 is a schematic of an intelligent brake control system for use with a segmented train braking system according to the present invention.
Figure 7:
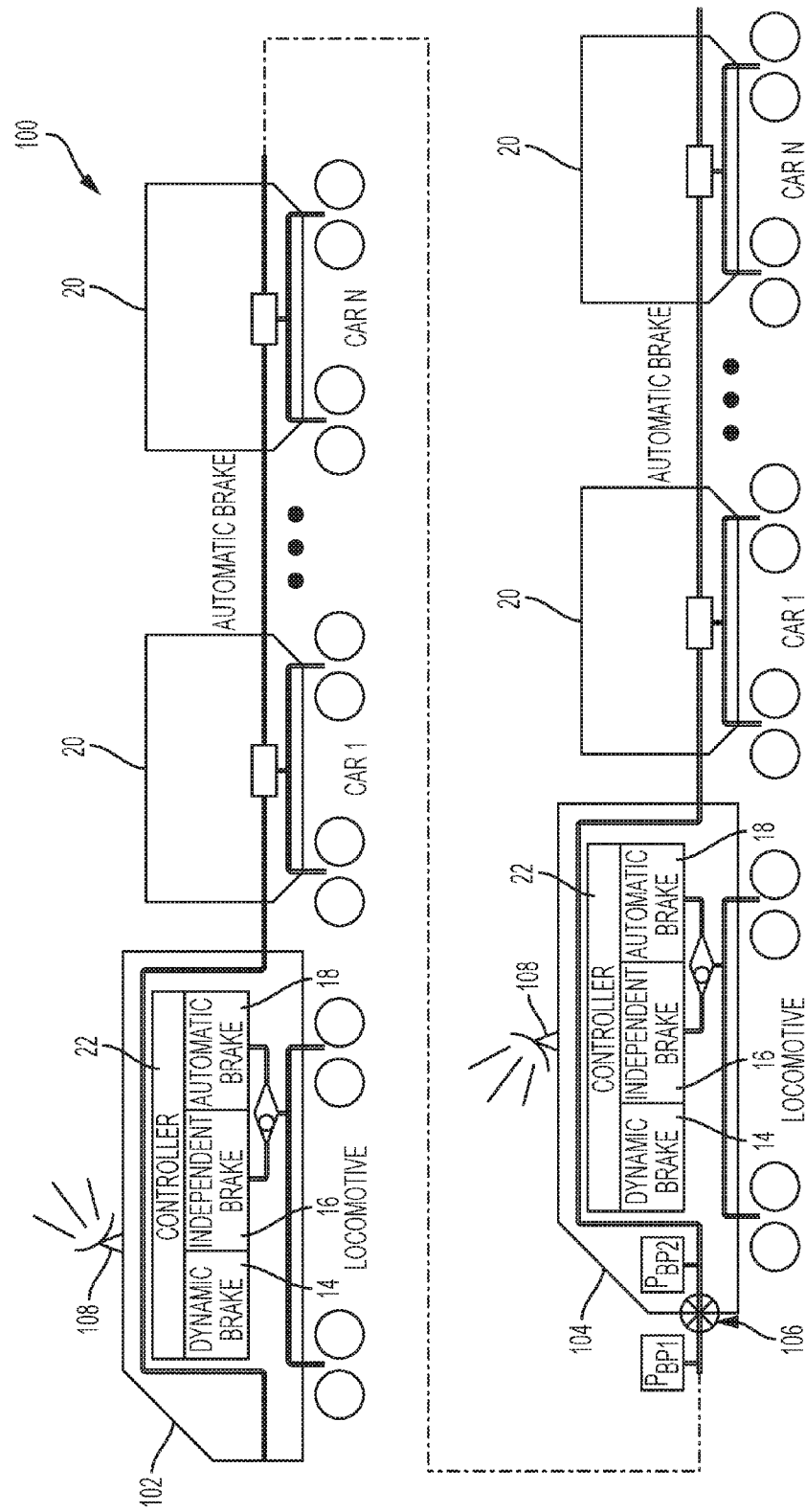
FIG. 7 is a schematic of a train having a segmented train braking system that is equipped with an intelligent brake control system according to the present invention.

Referring to FIGS. 6 and 7, the present invention may be incorporated into a segmented train braking system 100 by including a segmented brake pipe pressure 98 input to controller 22. In a segmented brake system 100, the brake pipe is isolated between the lead locomotive consist 102 and a remote locomotive consist 104 using a brake pipe segmentation device 106 so that service brake applications and releases can be made independently in each brake pipe segment BP1 and BP2 (or more). Emergency brake applications occur synchronously, or the same, in all segments. While segmented brake pipe systems are known and have been implemented using wireless communications transceivers 108, like those used in distributed power systems such as Locotrol®, use of a segmented brake pipe approach has not been widely adopted due to the complexity of manual operation. Controller 22 addresses that shortcoming by considering track topology, train makeup, train speed, train location on the track topology, and a train dynamics model governed by a ruleset which minimizes in-train forces, component wear and tear, and energy consumption while maintaining a high safety reserve as described above. In a train having intelligent brake controller 22 and a segmented brake pipe at one or more remote locomotive consists 104, then controller 22 on the lead locomotive consist 102 may autonomously command the application and release of the brakes on the remote consist(s) asynchronously, that is each train segment may have a different automatic brake command state. In this way, a train may travel through undulating territory for example, with the brakes applied on the train segment which is on a down gradient, while the brakes may be released on that train segment which is on a positive (uphill) gradient. In a similar fashion, if a train is traversing a long down grade with decreasing gradient, rather than power braking to maintain train speed, controller 22 may choose to release and recharge one or more brake pipe segments while maintaining the brake on other train segments, as determined the by the ruleset governed train dynamics model.

In the event of a communications loss between the controlling lead locomotive and a controlled remote locomotive, controller 22 on the remote consist 104, which has the same train dynamics module 50, track database 42, GPS positioner 44, etc., may operate autonomously in a communication loss mode. Controller 22 on the remote locomotive 104 may also have inputs of the brake pipe pressure from both sides of the segmented brake pipe, i.e., BP1 and BP2, at that locomotive. In event of a communications loss, controller 22 of remote locomotive 104 may read the brake pipe pressure of the adjoining brake pipe segment to determine the train brake commands of the adjoining segment and automatically make the same brake action on its controlled segmented brake pipe.

Figure 8:
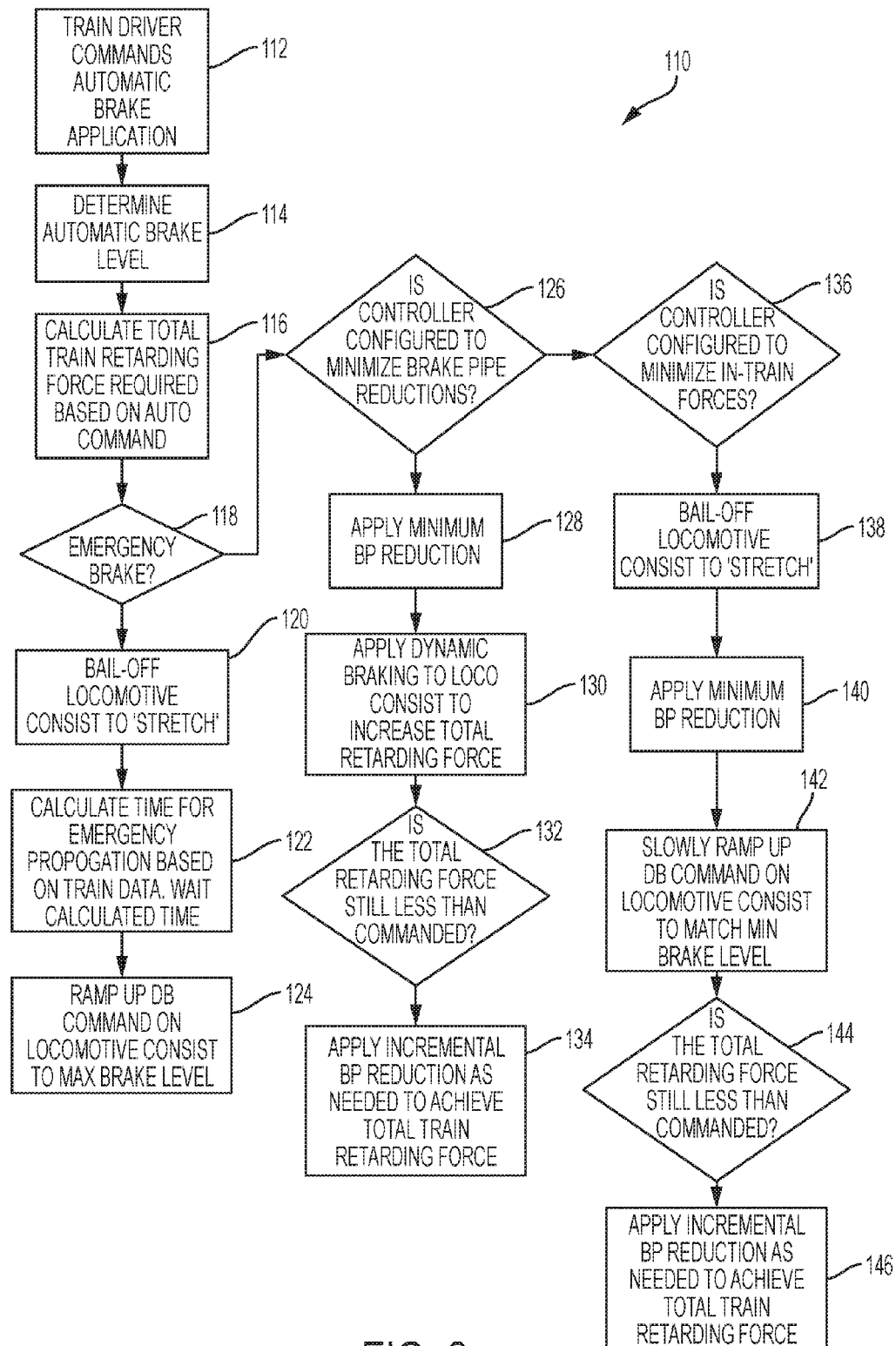
FIG. 8 is a flowchart of automatic brake management process according to the present invention.

Referring to FIG. 8, an exemplary automatic brake management process 110 begins with the train driver commanding an automatic brake application 112. The automatic brake level is then determined 114 and the total train retarding force that is required by the automatic brake command is then calculated 116. A check 118 is performed to determine whether the brake application is an emergency brake. If so, the locomotive consist is bailed off 120 to stretch the train. The time for propagation of the emergency brake is then calculated based on train data 122 and an emergency brake is executed for that time period. Once the time has passed, the dynamic brake is ramped up on the locomotive consist to the maximum brake level 124.

If check 118 does not determine an emergency brake has been commanded, a check 126 is performed to determine whether controller 22 is configured to minimize brake pipe reductions. If so, a minimum brake pipe reduction is applied 128 and dynamic braking is applied to the locomotive consist to increase the total retarding force 130. A check 132 is made to determine whether the total retarding force is less than the amount commanded and, if so, the brake pipe reduction is increased incrementally 134 until the total amount of retarding force reaches the amount commanded.

If check 126 determines that controller 22 is not configured to minimize brake pipe reductions, a check 136 is made to determine whether controller 22 is configured to minimize in-train forces. If so, the locomotive consist is bailed off to stretch the train 138. Next, a minimum brake pipe reduction is applied 140 and dynamic braking is slowly ramped up on the locomotive consist to match a minimum brake level 142. A check 144 is made to determine whether the total retarding force is less than the amount commanded and, if so, the brake pipe reduction is increased incrementally until the total amount of retarding force reaches the amount commanded 146.

Figure 9:
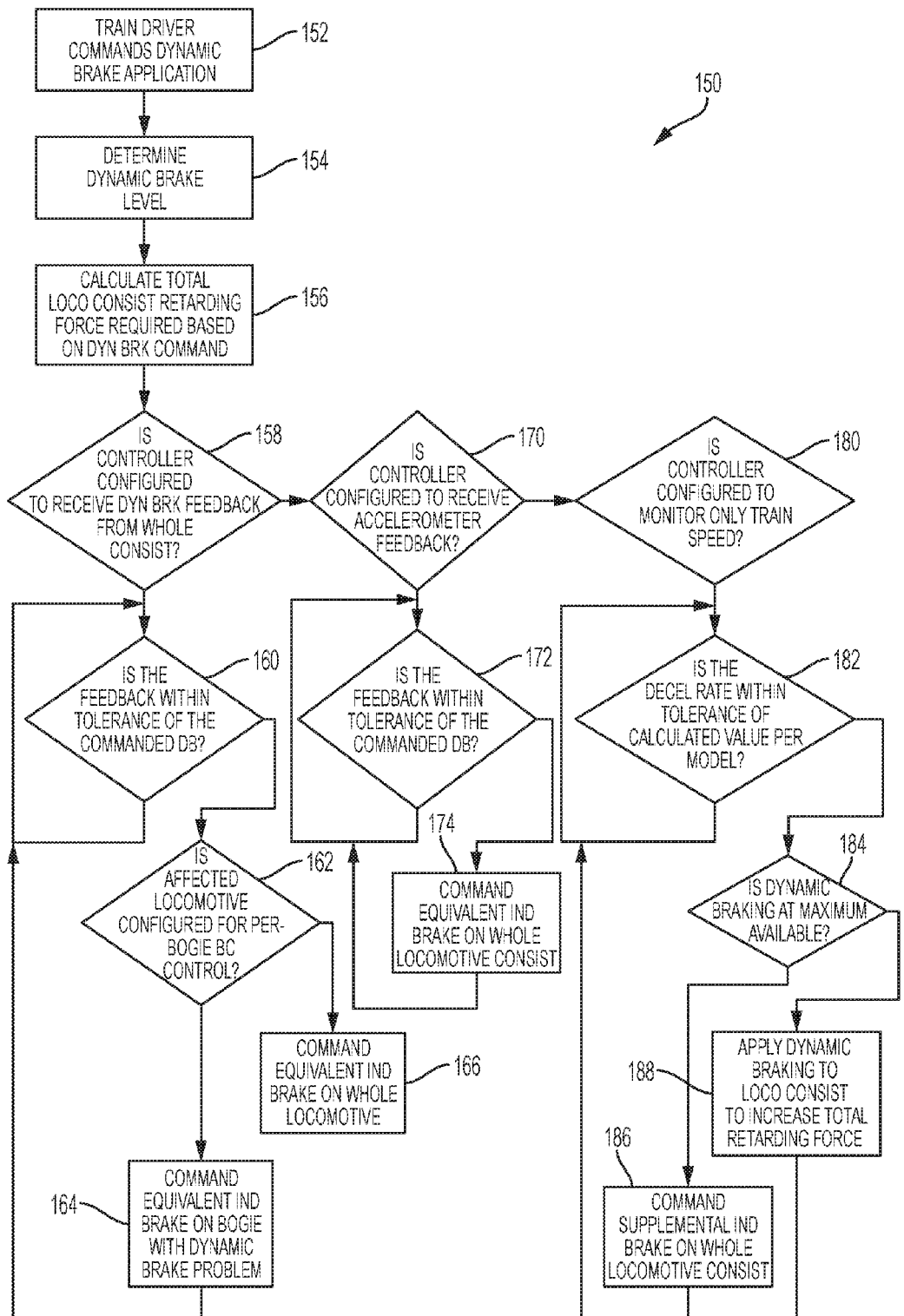
FIG. 9 is a dynamic brake management process according to the present invention.

Referring to FIG. 9, an exemplary dynamic brake management process 150 begins with the train driver commanding a dynamic brake application 152. The dynamic brake level is then determined 154 and the total locomotive consist retarding force that is required by the dynamic brake command is then calculated 156. A check 158 is performed to determine whether controller 22 is configured to receive dynamic brake feedback from the whole consist. If so, a check 160 is performed to determine whether the feedback is within tolerance of the commanded dynamic brake. If so, check 160 is repeated. If not, a check 162 is performed to determine whether the out of tolerance locomotive is configured for per-bogie brake cylinder control. If so, an independent brake equivalent to the dynamic brake is commanded on the out of tolerance bogie 164. If the out of tolerance locomotive is not configured for per-bogie BC control, an equivalent independent brake is commanded on the whole locomotive 166.

If check 158 determines that controller 22 is not configured to receive dynamic brake feedback from the whole consist, a check 170 is performed to determine whether controller 22 is configured to receive accelerometer feedback. If so, a check 172 is performed to determine whether the feedback is within tolerance of the commanded dynamic brake. If so, check 172 is repeated. If not, an equivalent independent brake is commanded on the locomotive consist 174 and control returns to check 172.

If check 170 determines that controller 22 is not configured to receive accelerometer feedback, a check 180 is performed to determine whether controller 22 is configured to monitor train speed. If so, a check 182 is performed to determine whether the deceleration rate is within the tolerance of the calculated deceleration using train dynamic modeling. If so, check 182 is repeated. If not, a check 184 is performed to determine whether dynamic braking is at the maximum level available. If so, a supplemental independent brake is commanded on the locomotive consist 186. If not, dynamic braking is increased over the locomotive consist 188 to increase the total retarding force and control returns to check 182.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A train braking system comprising:
   an interface for receiving input from a train driver using an automatic brake handle, an independent brake handle, and a dynamic brake handle;
   a controller coupled to the interface and having a first module for commanding a dynamic brake application, a second module for commanding an independent brake application, and a third module for commanding an automatic train brake application;
   wherein the controller is programmed to attenuate an automatic brake application input by a train driver and command an independent brake application or a dynamic brake application, or a combination thereof, to compensate for the attenuated automatic brake application and to achieve at least one predetermined criteria.

2. The system of claim 1, wherein the independent brake application or the dynamic brake application, or the combination thereof, that is commanded by the controller will achieve a braking effect that is equal to the automatic brake application input by the train driver.

3. The system of claim 2, wherein the predetermined criteria comprises at least one criteria selected from the group consisting of the amount of wear of consumable brake system parts, the amount of in-train forces that will result, and the amount of subsequent power braking that may be needed, and combinations thereof.

4. The system of claim 3, wherein the controller includes a train dynamics module that can calculate the current and future operation of the train over a given route.

5. The system of claim 4, wherein the controller is programmed to use the train dynamics module to select the independent brake application or the dynamic brake application, or the combination thereof, that will achieve the braking effect that is equal to the automatic brake application input by the train driver.

6. The system of claim 5, wherein the controller is programmed to automatically compensate for a dynamic brake failure by commanding an equivalent independent brake application or automatic brake application.

7. The system of claim 6, wherein the controller is programmed to obtain feedback about the operation of the train after the independent brake application or the dynamic brake application, or the combination thereof, and to perform an adjustment of the train dynamics module if the train does not behave as expected.

8. The system of claim 7, wherein the controller is programmed to maintain a particular train speed by automatically commanding a dynamic brake application, an independent brake application, or an automatic brake application, of combination thereof.

9. The system of claim 8, wherein the controller is programmed to compensate for the state of the train braking system when determining the independent brake application or the dynamic brake application, or the combination thereof, that will achieve the braking effect that is equal to the automatic brake application input by the train driver.

10. A method of controlling a train braking system, comprising the steps of:
    providing an interface for receiving input from a train driver using an automatic brake handle and a dynamic brake handle, a controller coupled to the interface and having a first module for commanding a dynamic brake application, a second module for commanding an independent brake application, and a third module for commanding an automatic train brake application; and
    using the controller to attenuate an automatic brake application input by a train driver and command an independent brake application or a dynamic brake application, or a combination thereof, that compensates for the attenuated automatic brake application and achieves at least one predetermined criteria.

11. The method of claim 10, wherein the independent brake application or the dynamic brake application, or the combination thereof, that is commanded by the controller achieves a braking effect that is equal to the automatic brake application input by the train driver.

12. The method of claim 11, wherein the predetermined criteria comprises at least one criteria selected from the group consisting of the amount of wear of consumable brake system parts, the amount of in-train forces that will result, and the amount of subsequent power braking that may be needed, and combinations thereof.

13. The method of claim 12, wherein the controller uses train dynamics formula to select the independent brake application or the dynamic brake application, or the combination thereof, that will achieve the braking effect that is equal to the automatic brake application input by the train driver.

14. The method of claim 13, further comprising the step of automatically compensating for a dynamic brake failure by commanding an equivalent independent brake application or automatic brake application, or combination thereof.

15. The method of claim 14, further comprising the steps of:
    obtaining feedback about the operation of the train after the independent brake application or the dynamic brake application, or the combination thereof, and
    performing an adjustment of the train dynamics formula if the train does not behave as expected.

* * * * *